(12) United States Patent
Solomon et al.

(10) Patent No.: US 8,146,555 B2
(45) Date of Patent: Apr. 3, 2012

(54) DIRECT-INJECTION SPARK-IGNITION SYSTEM

(75) Inventors: Arun S. Solomon, Rochester Hills, MI (US); Ronald M. Otto, Rochester Hills, MI (US); Patrick G. Szymkowicz, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1016 days.

(21) Appl. No.: 12/057,826

(22) Filed: Mar. 28, 2008

(65) Prior Publication Data

US 2008/0257303 A1    Oct. 23, 2008

Related U.S. Application Data

(60) Provisional application No. 60/912,217, filed on Apr. 17, 2007.

(51) Int. Cl.
*F02B 25/06* (2006.01)
*H01T 13/20* (2006.01)

(52) U.S. Cl. .................. 123/169 EL; 313/141

(58) Field of Classification Search .................. 123/295, 123/169 EL, 169 EA, 169 EC, 169 E, 169 G, 123/143 R, 146.5 B, 146.5 R; 313/118, 141
See application file for complete search history.

(56) References Cited

U.S. PATENT DOCUMENTS

| | | | |
|---|---|---|---|
| 6,227,164 B1 | 5/2001 | Miller | |
| 6,357,408 B1 | 3/2002 | Bridge et al. | |
| 2003/0085643 A1 | 5/2003 | Matsubara | |
| 2004/0012318 A1 | 1/2004 | Ishikawa | |
| 2007/0051333 A1 | 3/2007 | Ashizawa | |

FOREIGN PATENT DOCUMENTS

| | | |
|---|---|---|
| DE | 10155404 A1 | 5/2003 |
| DE | 69922366 T2 | 12/2005 |
| JP | 2000-277234 A | 10/2000 |
| JP | 2003-257585 A | 9/2003 |
| JP | 2006-318664 A | 11/2006 |

OTHER PUBLICATIONS

Hybrid Spark Plug OE Success for NGK with New Audi R8, NGK Press Release, Apr. 24, 2007, p. 1-2, NGK Spark Plugs (UK) Limited, Hemel Hempstead, United Kingdom.
Hybrid Spark Plug OE Success for NGK with New Audi R8, NGK Press Release, 2006, p. 1, NGK Spark Plug Europe GmbH, Ratingen, Germany.

*Primary Examiner* — John T. Kwon
*Assistant Examiner* — Johnny Hoang

(57) ABSTRACT

A spark plug includes a center electrode substantially aligned with a longitudinal first axis and a surface-gap ground electrode radially aligned with the center electrode along a surface-gap electrode second axis substantially orthogonal to the longitudinal first axis and passing therethrough. The center electrode and the surface-gap ground electrode define a radial spark gap therebetween. The spark plug further includes a J-gap ground electrode radially aligned with the center electrode. The center electrode and the J-gap ground electrode define an axial spark gap therebetween. The J-gap ground electrode radial alignment has an angular separation from the surface-gap electrode second axis of no greater than about 30 degrees.

19 Claims, 5 Drawing Sheets

DIRECT-INJECTION SPARK-IGNITION SYSTEM

CROSS REFERENCE TO RELATED APPLICATIONS

This application claims the benefit of U.S. Provisional Application No. 60/912,217 filed on Apr. 17, 2007 which is hereby incorporated herein by reference.

TECHNICAL FIELD

This disclosure is related to spark-ignited, direct-injection (SIDI) internal combustion engines.

BACKGROUND

Engineers are developing spark-ignition engines with direct fuel injection (SIDI) which operate using either a stratified combustion charge strategy or a homogeneous combustion charge strategy, depending upon operator demand for power and engine operating conditions. Generally, at high load conditions the SIDI engine is operated with a homogenous charge and at low load conditions the SIDI engine is operated with a stratified charge.

Generally, a spray guided SIDI engine has a fuel injector including an outlet with a multi-port tip to effect multiple cone-shaped spray paths of fuel. In the spray guided SIDI engine, a spark plug and the fuel injector are cooperatively arranged such that a portion of the fuel spray path intersects the spark gap of the spark plug. During stratified combustion modes, fuel interacting with a spark in the spark gap provides ignition of the fuel.

With SIDI engine spark plugs, heat is lost to adjacent surfaces thereby slowing the burning rate of the fuel and thus slowing the growth of a flame kernel. In particular, heat losses to adjacent surfaces can slow the burning rate to a level such that the flame kernel is extinguish, thereby causing a misfire.

A prior art J-gap spark plug 10 is illustrated in FIG. 1. The J-gap spark plug 10 is generally robust to misfire events during homogeneous and warmed-up stratified operating modes. The J-gap spark plug 10 has a single ground electrode 17, a tip insulator 15, a center electrode 13 and an axial spark gap 11 between the center electrode 13 and the ground electrode 17. The axial spark gap 11 is projected away from any metal or insulating surfaces, such that a flame kernel initiated by the arc in the axial spark gap 11 can grow in size without losing heat to adjacent surfaces.

Drawbacks associated with the J-gap spark plug 10 include susceptibility to fouling and misfiring during cold, stratified operating modes. When running cold and stratified, large amounts of fine soot formed in the combustion process condense and adhere to the tip insulator 15. The accumulation of soot on the tip insulator 15 provides a short circuit path for the arc to travel from the center electrode 13 down the tip insulator 15 to a base of the tip insulator 15, rather than across the axial spark gap 11.

A prior art hybrid spark plug 20 is illustrated in FIGS. 2A and 2B. The hybrid spark plug 20 includes three ground electrodes: a J-gap ground electrode 28 and two surface-gap ground electrodes 23. The hybrid spark plug 20 further includes a tip insulator 27 and a center electrode 29. The surface-gap ground electrodes 23 are arranged at 90 degree positions relative to the J-gap ground electrode 28 and diametrically opposing each other (that is, being positioned along a diameter and having an orientation that differs by 180 degrees.) The J-gap ground electrode 28 and the center electrode 29 define an axial spark gap 21. The surface-gap ground electrodes 23 and the center electrode 29 define radial spark gaps 25.

The hybrid spark plug 20 performs well in preventing cold plug fouling but proves marginal in preventing misfires during homogeneous and warmed-up stratified operating modes. When sufficient amounts of soot accumulate on the insulator, misfiring occurs at the axial spark gap 21. By providing the surface-gap ground electrodes 23 in proximity to a surface of the insulator tip 27, the arc is preferentially directed across the radial spark gap 25 preventing a total misfire. Successive spark firings across the radial spark gap 25 burn off the condensed soot on the insulator 27 surface keeping it clean and providing a deterministic path for the arc. The hybrid spark plug 20 exhibits improved cold plug fouling over the J-gap spark plug 10 because carbon accumulation on the insulator tip 27 is burned off by the surface-gap ground electrode 23.

However, because the radial spark gap 25 is very close to the insulator surface, heat loss to the insulator tip 27 is increased. Further, the two surface-gap ground electrodes 23 block fuel streams directed to other parts of a combustion chamber (not shown) of an internal combustion engine (not shown). Therefore, the likelihood of flame-kernel-quenching misfire is increased. Thus, the hybrid spark plug 20 is associated with warmed-up stratified misfiring.

SUMMARY

A spark plug includes a center electrode substantially aligned with a longitudinal first axis and a surface-gap ground electrode radially aligned with the center electrode along a surface-gap electrode second axis substantially orthogonal to the longitudinal first axis and passing therethrough. The center electrode and the surface-gap ground electrode define a radial spark gap therebetween. The spark plug further includes a J-gap ground electrode radially aligned with the center electrode. The center electrode and the J-gap ground electrode define an axial spark gap therebetween. The J-gap ground electrode radial alignment has an angular separation from the surface-gap electrode second axis of no greater than about 30 degrees.

BRIEF DESCRIPTION OF THE DRAWINGS

One or more embodiments will now be described, by way of example, with reference to the accompanying drawings, in which.

DETAILED DESCRIPTION

Figure 1:
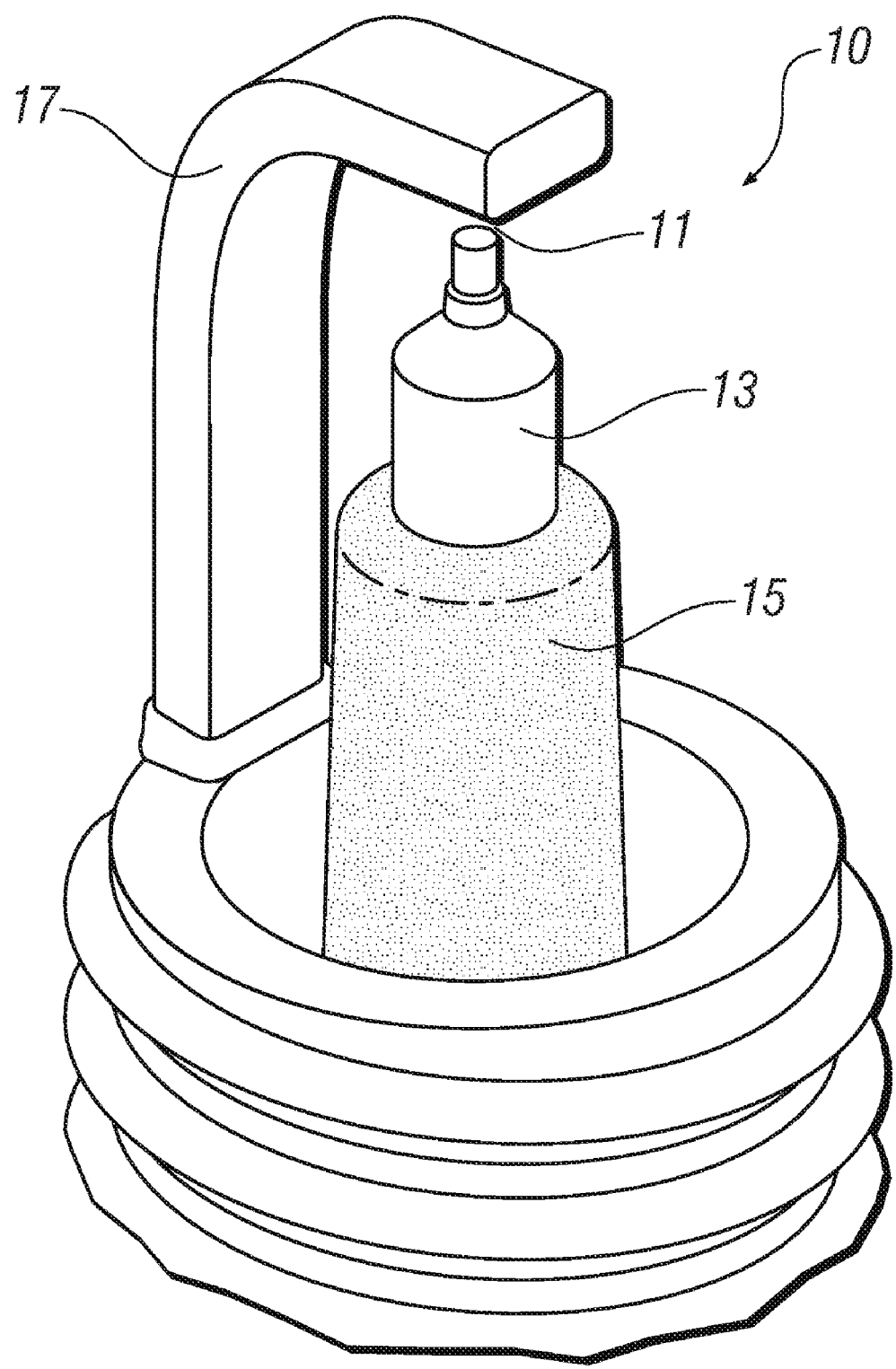
FIG. 1 illustrates a prior art J-gap spark plug.
Figure 2A:
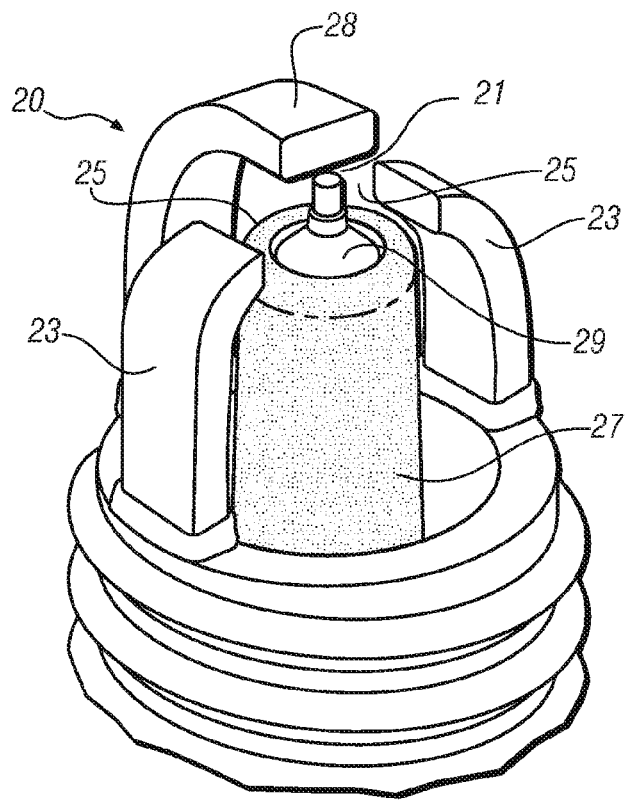
FIG. 2A illustrates a prior art hybrid spark plug.
Figure 2B:
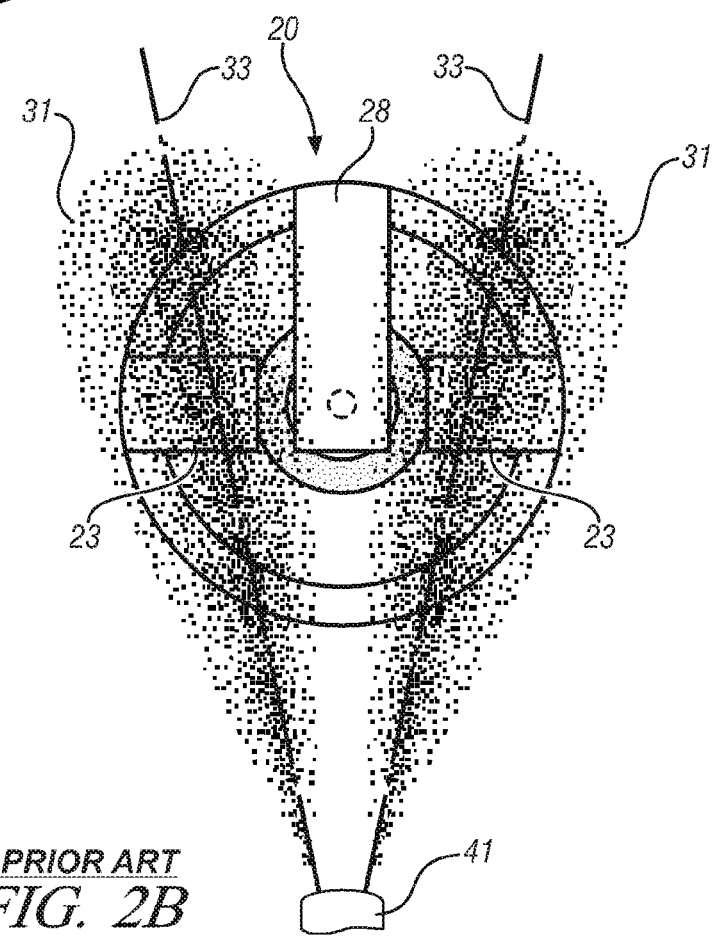
FIG. 2B illustrates an end view of the hybrid spark plug of FIG. 2A in conjunction with an exemplary fuel spray pattern.
Figure 3A:
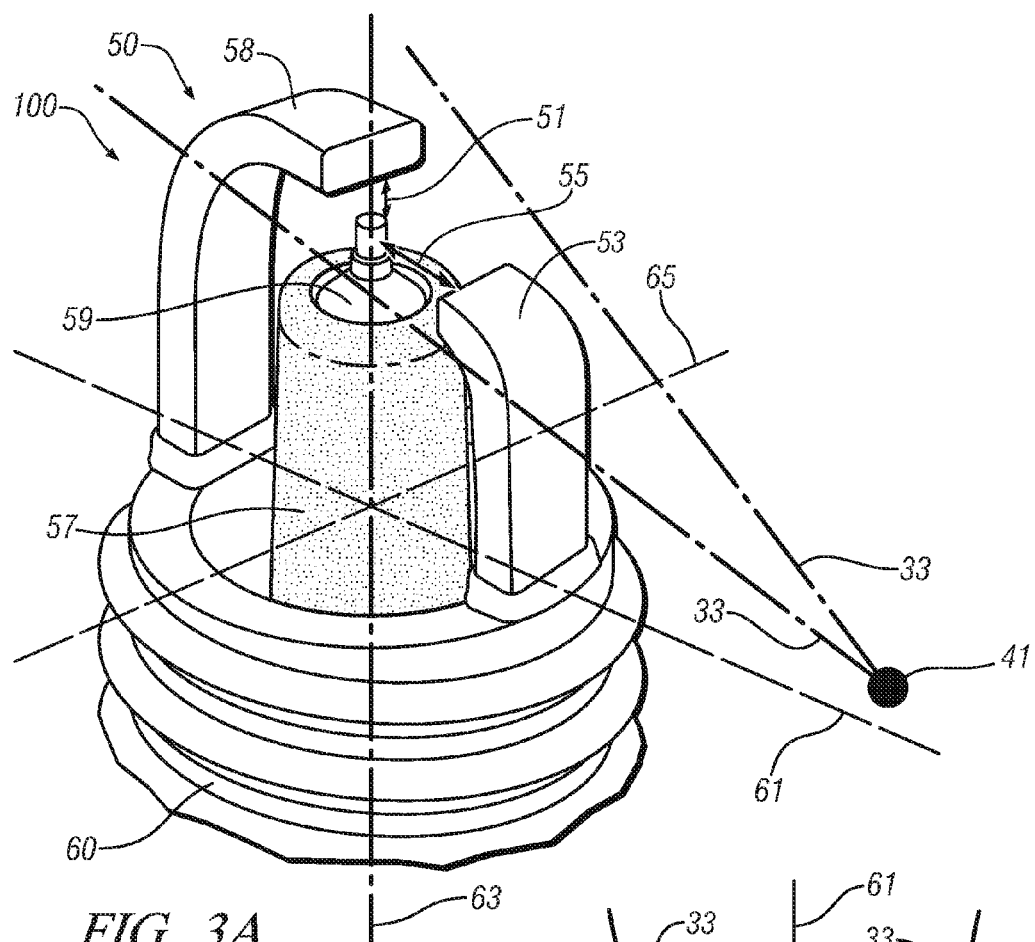
FIG. 3A illustrates an exemplary embodiment of a spark-ignition system in accordance with the present disclosure.
Figure 3B:
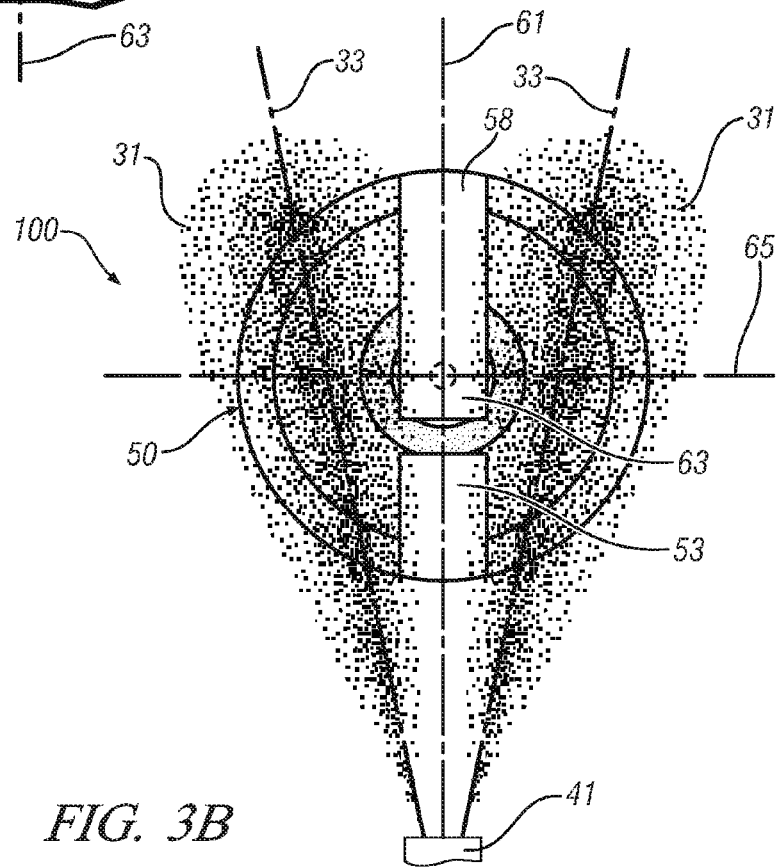
FIG. 3B illustrates end view of the spark-ignition system of FIG. 3A.

Referring now to FIGS. 3A and 3B, wherein the showings are for the purpose of illustrating certain exemplary embodiments only and not for the purpose of limiting the same, FIGS. 3A and 3B show a direct-injection spark-ignition system 100.

The direct-injection spark-ignition system 100 is a subsystem of a spark-ignited, direct-injection (SIDI) internal combustion engine powered vehicle (not shown). In particular, the direct-injection spark-ignition system 100 provides ignition to the SIDI internal combustion engine (not shown). The direct-injection spark-ignition system includes a spark plug 50 and a fuel injector 41.

The spark plug 50 is configured to ignite the fuel provided by the fuel injector 41. The spark plug 50 includes a center electrode 59, a surface-gap ground electrode 53, a J-gap ground electrode 58, an insulator 57, and a generally cylindrical, threaded base portion 60.

The spark-ignition system 100 is illustrated in FIG. 3A with respect to a three-dimensional orthogonal coordinate system wherein locations and orientations of the components of the spark-ignition system 100 are described in reference to axes of the spark plug 50. In particular, the coordinate system includes a longitudinal first axis 63 corresponding to a longitudinal axis of the spark plug 50, a surface-gap electrode second axis 61 substantially orthogonal to the longitudinal first axis 63 and passing therethrough, and an orthogonal third axis 65. FIG. 3B represents an overhead view, looking along longitudinal first axis 63. Axial direction is defined as parallel to the longitudinal first axis 63 and radial directions are orthogonal to the longitudinal first axis 63.

The J-gap ground electrode 58 and the surface-gap ground electrode 53 each extend substantially axially from the base portion 60 and then bend radially inward. The J-gap ground electrode 58 extends axially beyond the center electrode 59 tip and bends radially inward sufficiently to define an axial spark gap 51 therewith. The surface-gap ground electrode 53 extends axially and bends radially inward sufficiently to define a radial spark gap 55 with the center electrode 59.

During operation, ionized gas in the axial spark gap 51 and radial spark gap 55, provide paths of lowest electrical resistance between the center electrode 59 and the surface-gap ground electrodes 53, and between the center electrode 59 and the J-gap ground electrode 58. Therefore, the radial spark gap 55 provides a path in which sparking is produced during spark plug firing by electrons flowing between the center electrode 59 and the surface-gap ground electrode 53. Likewise, the axial spark gap 51 provides a path in which sparking is produced during spark plug firing by electrons flowing between the center electrode 59 and the J-gap ground electrode 58.

In the other embodiments, the location, orientation, shape, and design of the electrodes can vary from that of the spark-ignition system 100.

In the spark plug 50, the ground electrodes 53 and 58 are radially disposed about the base portion 60. The surface-gap electrode 53 is aligned with the surface-gap electrode second axis 61 and, in this embodiment, the J-gap ground electrode 58 is also aligned with the surface-gap electrode second axis 61. In this embodiment, the electrodes 53 and 58 are diametrically opposed to each other. That is, with an angular separation of substantially 180 degrees relative to each other. However, the angular orientation of the J-gap electrode 58 as measured with respect to an acute angular deviation from the surface-gap electrode second axis 61 is substantially 0 degrees. And, as used herein, angular deviation from the surface-gap electrode second axis shall refer to acute angular deviations. In the embodiment of FIGS. 3A and 3B, the J-gap electrode has an angular deviation from the surface-gap electrode second axis of substantially 0 degrees and further wherein the J-gap ground electrode and the surface-gap ground electrode are diametrically opposed. In an alternate embodiment illustrated with respect to FIG. 4 as described further herein below, the J-gap electrode also has an angular deviation from the surface-gap electrode second axis of substantially 0 degrees; however, in the embodiment of FIG. 4, the J-gap ground electrode and the surface-gap ground electrode are diametrically aligned.

The fuel injector 41 provides atomized fuel particles for ignition. The fuel injector 41 comprises a fuel injector tip (not shown) having multiple fuel outlets (not shown). Each outlet has a selected shape to provide a selected dispersion level and droplet size.

During operation, the fuel injector 41 atomizes fuel particles by forcing the fuel through the outlets. The fuel injector 41 is disposed in a nominal indexing position relative to the spark plug 50 such that fuel plumes injected from the fuel injector 41 travel along spray paths in general directions as illustrated. The fuel injector 41 injects the fuel such that two adjacent fuel spray paths 31 are substantially symmetrically distributed on either side of the surface-gap electrode second axis 61 of the spark plug 50. The fuel spray paths 31 extend along generally expanding cone-shaped paths generally along axes 33. The fuel spray paths have a substantially increasing spatial distribution moving further away from the fuel injector 41 but are substantially symmetrical about respective axes 33 as illustrated.

The spark plug 50 is disposed in a cooperative indexing arrangement with a fuel injector 40. In particular, the spark plug 50 is disposed in a nominal rotational indexing position relative to the injector tip, as illustrated. The fuel injector 41 is disposed in alignment with respect to the surface-gap electrode second axis 61. This indexing allows fuel paths 31 that intersect with the axial spark gap 51. For example, in the system 100, preferably between about 10 volume percent and 20 volume percent of the fuel traverses the radial spark gap 55.

The spark plug 50 is disposed in the shown orientation in the system 100 by indexing the spark plug 50 to the selected rotational orientation. The spark plug 50 is indexed by sealing washers employed between the spark plug 50 and an engine head (not shown) into which it is installed to achieve a selected installation orientation. In particular, spark plug 50 is indexed relative to injector tip 41 such that a plane defined by the surface-gap electrode second axis 61 and the longitudinal first axis 63 passes through the injector tip 41.

In an alternate embodiment, the base portion of a spark plug is configured such that the spark plug is properly indexed after having a selected number of revolutions when screwing the spark plug into an engine head.

In other exemplary embodiments, the spark plug 50 is indexed with varying degrees of offset from the alignment of FIGS. 3A and 3B, while still providing a cooperative relationship between the spark plug 50 and the injector spray pattern. In particular, other exemplary embodiments include other spark plug indexing positions wherein selected portions of the fuel spray paths traverse radial spark gap 55. Further, other exemplary embodiments include other spark plug indexing positions wherein the fuel will be ignited such that flame kernel can grow unhindered by surface-gap ground electrodes.

Figure 4:
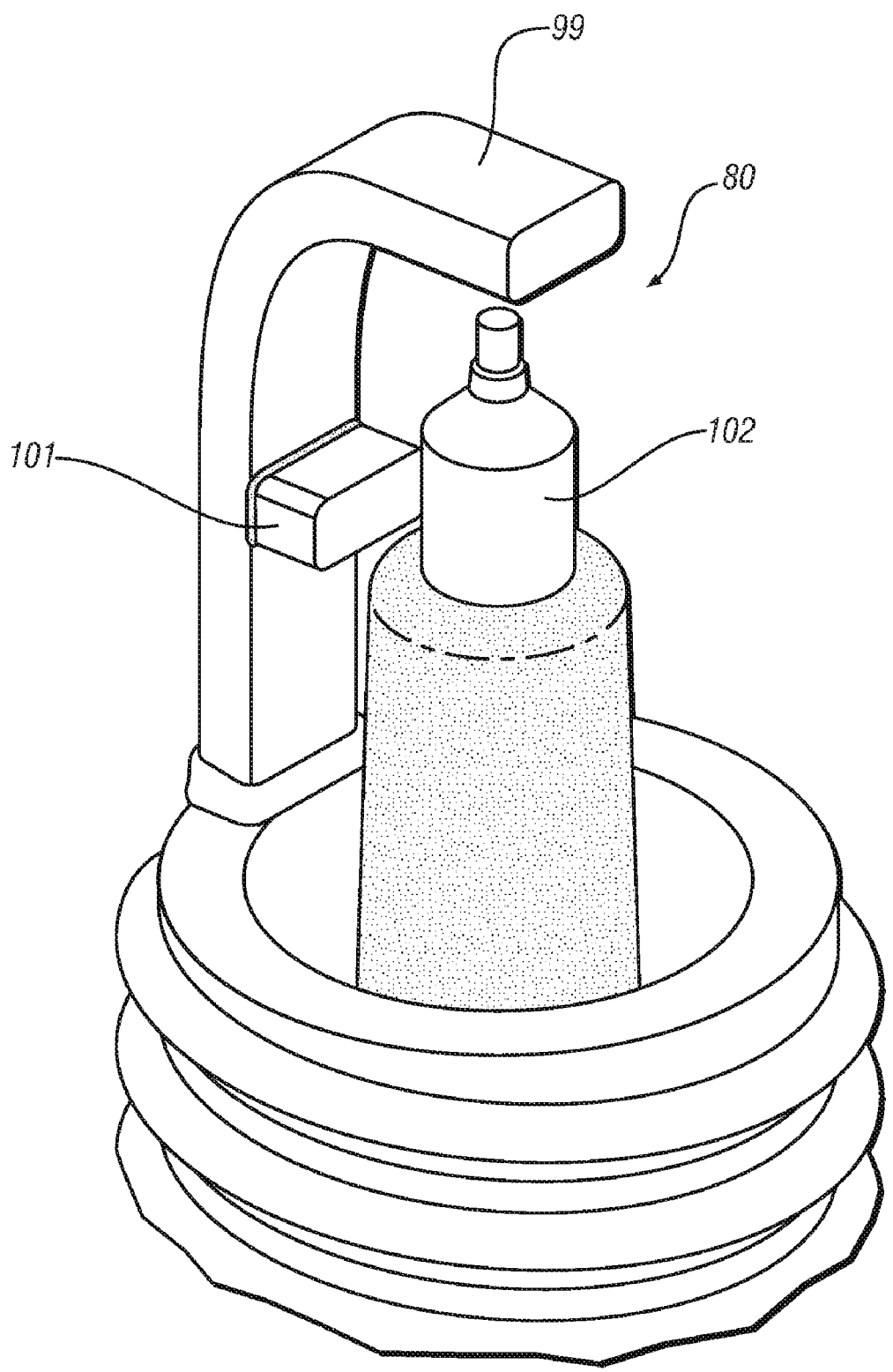
FIG. 4 illustrates an exemplary embodiment of a spark plug in accordance with the present disclosure.

Referring to FIG. 4, a spark plug 80 in accordance with another exemplary embodiment is shown. The spark plug 80 comprises a J-gap ground electrode 99, a surface-gap ground electrode 101, and a center electrode 102. In the spark plug 80, the surface gap ground electrode 101 and the J-gap ground electrode 99 are substantially diametrically aligned with each other and the J-gap electrode has an angular deviation from the surface-gap electrode second axis of substantially 0 degrees. In the embodiment of FIG. 4, like the embodiment of FIGS. 3A and 3B, the angular deviation from the surface-gap electrode second axis is referred to as being substantially 0 degrees, even though the two embodiments represent diametrically aligned and diametrically opposed ground electrode arrangements, respectively.

Figure 5:
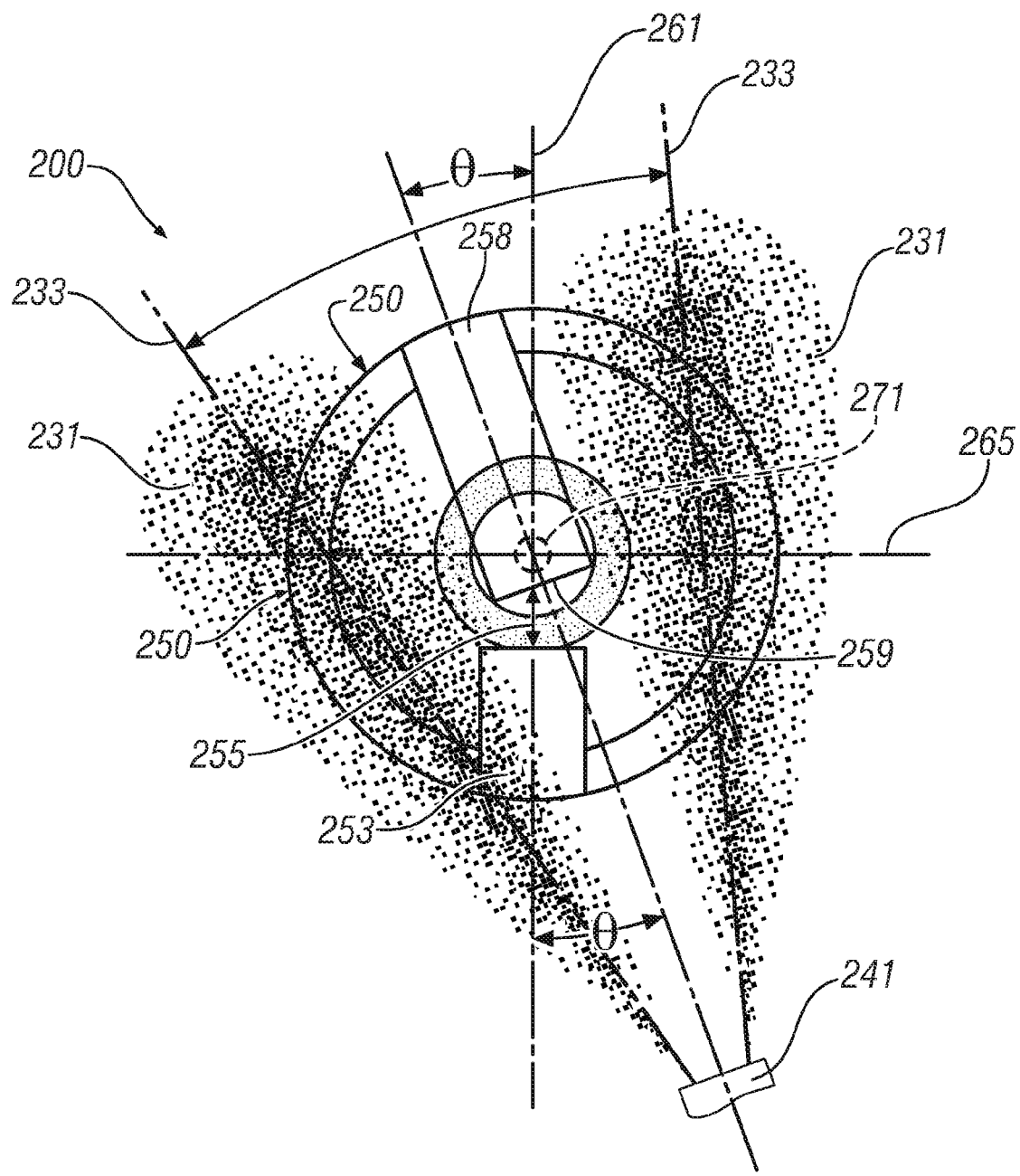
FIG. 5 illustrates another exemplary embodiment of a spark-ignition system in accordance with the present disclosure.

Referring to FIG. 5, a spark-ignition system 200 in accordance with another exemplary embodiment is shown. The spark-ignition system 200 includes a spark plug 250 and a fuel injector 241.

The spark-ignition system 200 is illustrated in FIG. 5 with respect to a three-dimensional orthogonal coordinate system wherein in locations and orientations of the components of the spark-ignition system are described in reference to axes of the spark plug 250. In particular FIG. 5 presents an overhead view looking down on a longitudinal first axis. The coordinate system further includes a surface-gap electrode second axis 261 and an orthogonal third axis 265.

The spark plug 250 includes a center electrode 259, a surface-gap ground electrode 253, and a J-gap ground electrode 258. The J-gap ground electrode 258 and the surface-gap ground electrode 253 each extend substantially axially from a base portion and then bend radially inward, substantially as described in reference to the embodiment of FIGS. 3A and 3B. The J-gap ground electrode 258 extends axially beyond the center electrode 259 tip and bends radially inward sufficiently to define an axial spark gap therewith (occluded in the view of FIG. 5). The surface-gap ground electrode 253 extends axially and bends radially inward sufficiently to define a radial spark gap 255 with the center electrode 259.

In the spark plug 250, the surface-gap ground electrode 253 and the J-gap ground electrode 258 are radially disposed about the base portion. Surface-gap ground electrode 253 is aligned with the surface-gap electrode second axis 261. J-gap ground electrode 258 is disposed generally opposite the surface-gap ground electrode 253 however with an angular deviation from the surface-gap electrode second axis of θ degrees. In the illustrated embodiment, θ is substantially 20 degrees. Thus, in this embodiment, the J-gap electrode is substantially 20 degrees from diametric opposition to the surface-gap ground electrode 253. Alternatively, the arrangement of the ground electrodes may be such that the angular deviation from the surface-gap electrode second axis is measured relative to diametric alignment. Regardless of whether the ground electrode arrangements have angular deviations relative to diametric opposition or alignment, the J-gap ground electrode preferably has an angular deviation from the surface-gap electrode second axis 261 in a range of (+/−) 30 degrees.

In the system 200, the fuel injector 241 and the J-gap ground electrode 258 are preferably diametrically aligned as shown in FIG. 5. The fuel injector 241 injects the fuel such that two adjacent fuel spray paths 231 are substantially evenly distributed on either side of the axis defined by the alignment of the injector 241 and the J-gap ground electrode 258. The fuel spray paths 231 extend along a generally expanding cone-shaped path along a pair of axes 233. The fuel spray paths have a substantially increasing spatial distribution moving further away from the fuel injector 241 but are substantially symmetrical about respective axes 233 as illustrated.

In other embodiments the fuel injector is disposed at angular orientations that are not in alignment with radial axes of either of the J-gap electrode or the surface-gap electrode. Angular deviations from the surface-gap electrode second axis in a range of about (+/−) 20 degrees, however, are preferred. One of ordinary skill in the art will appreciate other embodiments in which fuel spray paths will provide selected amounts of fuel to the axial spark gap and the radial spark gap.

In other embodiments, fuel injectors may have other spray patterns traversing spark gaps of spark plugs. For example, one or more than two spray patterns, and spray patterns directed along other axes which do not pass through the longitudinal axis of the spark plug can be used.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A direct-injection spark-ignition system, comprising:
 a fuel injector configured to provide fuel to a combustion chamber of an internal combustion engine; and
 a spark plug having a longitudinal first axis and configured to ignite the fuel provided by the fuel injector, the spark plug comprising
  a center electrode substantially aligned with the longitudinal first axis,
  a surface-gap ground electrode radially aligned with the center electrode along a surface-gap electrode second axis substantially orthogonal to the longitudinal first axis and passing therethrough, the center electrode and the surface-gap ground electrode defining a radial spark gap therebetween, and
  a J-gap ground electrode radially aligned with the center electrode, the center electrode and the J-gap ground electrode defining an axial spark gap therebetween, said J-gap ground electrode radial alignment having an angular separation from said surface-gap electrode second axis of no greater than about 30 degrees, wherein the fuel injector is aligned within 20 degrees of said surface-gap electrode second axis.

2. The spark plug of claim 1, wherein said J-gap ground electrode and said surface-gap electrode are in diametric opposition.

3. The direct-injection spark-ignition system of claim 1, wherein said J-gap ground electrode and said surface-gap electrode are in diametric alignment.

4. The direct-injection spark-ignition system of claim 1, wherein the sparkplug has a single surface-gap ground electrode.

5. A direct-injection spark-ignition system, comprising:
 a fuel injector configured to provide fuel to a combustion chamber of an internal combustion engine; and
 a spark plug having a longitudinal first axis and configured to ignite the fuel provided by the fuel injector, the spark plug comprising
  a center electrode substantially aligned with the longitudinal first axis,
  a surface-gap ground electrode radially aligned with the center electrode along a surface-gap electrode second axis substantially orthogonal to the longitudinal first axis and passing therethrough, the center electrode and the surface-gap ground electrode defining a radial spark gap therebetween, and
  a J-gap ground electrode radially aligned with the center electrode, the center electrode and the J-gap ground electrode defining an axial spark gap therebetween, said J-gap ground electrode radial alignment having an angular separation from said surface-gap electrode second axis of no greater than about 30 degrees, wherein the fuel injector is substantially aligned with said surface-gap electrode second axis.

6. The direct-injection spark-ignition system of claim 5, wherein said J-gap ground electrode and said surface-gap electrode are in diametric opposition.

7. The direct-injection spark-ignition system of claim 5, wherein said J-gap ground electrode and said surface-gap electrode are in diametric alignment.

8. A direct-injection spark-ignition system, comprising:
   a fuel injector configured to provide fuel to a combustion chamber of an internal combustion engine; and
   a spark plug having a longitudinal first axis and configured to ignite the fuel provided by the fuel injector, the spark plug comprising
      a center electrode substantially aligned with the longitudinal first axis,
      a surface-gap ground electrode radially aligned with the center electrode along a surface-gap electrode second axis substantially orthogonal to the longitudinal first axis and passing therethrough, the center electrode and the surface-gap ground electrode defining a radial spark gap therebetween, and
      a J-gap ground electrode radially aligned with the center electrode, the center electrode and the J-gap ground electrode defining an axial spark gap therebetween, said J-gap ground electrode radial alignment having an angular separation from said surface-gap electrode second axis of no greater than about 30 degrees, wherein the fuel injector urges fuel along multiple spray paths.

9. The spark plug of claim 8, wherein said J-gap ground electrode and said surface-gap electrode are in diametric opposition.

10. The direct-injection spark-ignition system of claim 8, wherein said J-gap ground electrode and said surface-gap electrode are in diametric alignment.

11. A direct-injection spark-ignition system, comprising:
   a fuel injector configured to provide fuel to a combustion chamber of an internal combustion engine; and
   a spark plug having a longitudinal first axis and configured to ignite the fuel provided by the fuel injector, the spark plug comprising
      a center electrode substantially aligned with the longitudinal first axis,
      a surface-gap ground electrode radially aligned with the center electrode along a surface-gap electrode second axis substantially orthogonal to the longitudinal first axis and passing therethrough, the center electrode and the surface-gap ground electrode defining a radial spark gap therebetween, and
      a J-gap ground electrode radially aligned with the center electrode, the center electrode and the J-gap ground electrode defining an axial spark gap therebetween, said J-gap ground electrode radial alignment having an angular separation from said surface-gap electrode second axis of no greater than about 30 degrees, wherein between about 10 volume percent and 20 volume percent of the fuel provided traverses the radial spark gap.

12. The spark plug of claim 11, wherein said J-gap ground electrode and said surface-gap electrode are in diametric opposition.

13. The direct-injection spark-ignition system of claim 11, wherein said J-gap ground electrode and said surface-gap electrode are in diametric alignment.

14. A direct-injection spark-ignition system, comprising:
   a fuel injector configured to provide fuel to a combustion chamber of an internal combustion engine; and
   a spark plug having a longitudinal first axis and configured to ignite the fuel provided by the fuel injector, the spark plug comprising
      a center electrode substantially aligned with the longitudinal first axis,
      a surface-gap ground electrode radially aligned with the center electrode along a surface-gap electrode second axis substantially orthogonal to the longitudinal first axis and passing therethrough, the center electrode and the surface-gap ground electrode defining a radial spark gap therebetween, and
      a J-gap ground electrode radially aligned with the center electrode, the center electrode and the J-gap ground electrode defining an axial spark gap therebetween, said J-gap ground electrode radial alignment having an angular separation from said surface-gap electrode second axis of no greater than about 30 degrees, wherein the surface-gap ground electrode is disposed between the radial spark gap and the fuel injector.

15. The spark plug of claim 14, wherein said J-gap ground electrode and said surface-gap electrode are in diametric opposition.

16. The direct-injection spark-ignition system of claim 14, wherein said J-gap ground electrode and said surface-gap electrode are in diametric alignment.

17. A direct-injection spark-ignition system, comprising:
   a fuel injector configured to provide fuel to a combustion chamber of an internal combustion engine; and
   a spark plug having a longitudinal first axis and configured to ignite the fuel provided by the fuel injector, the spark plug comprising
      a center electrode substantially aligned with the longitudinal first axis,
      a surface-gap ground electrode radially aligned with the center electrode along a surface-gap electrode second axis substantially orthogonal to the longitudinal first axis and passing therethrough, the center electrode and the surface-gap ground electrode defining a radial spark gap therebetween, and
      a J-gap ground electrode radially aligned with the center electrode, the center electrode and the J-gap ground electrode defining an axial spark gap therebetween;
   wherein the fuel injector directs fuel such that between about 10 volume percent and 20 volume percent of the fuel provided traverses the radial spark gap.

18. The direct-injection spark-ignition system of claim 17, wherein said surface-gap ground electrode consists of only a single surface-gap ground electrode.

19. The direct-injection spark-ignition system of claim 17, wherein said J-gap ground electrode radial alignment has an angular separation from said surface-gap electrode second axis of substantially 0 degrees.

* * * * *